US009519329B2

(12) United States Patent
Park et al.

(10) Patent No.: US 9,519,329 B2
(45) Date of Patent: *Dec. 13, 2016

(54) IMAGE FORMING APPARATUS AND POWER CONTROL METHOD THEREOF

(71) Applicant: SAMSUNG ELECTRONICS CO., LTD., Suwon-si, Gyeonggi-do (KR)

(72) Inventors: Man-suk Park, Seoul (KR); Kyu-sung Kim, Yongin (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 203 days.

This patent is subject to a terminal disclaimer.

(21) Appl. No.: 13/728,278

(22) Filed: Dec. 27, 2012

(65) Prior Publication Data
US 2013/0138986 A1 May 30, 2013

Related U.S. Application Data

(63) Continuation of application No. 12/877,757, filed on Sep. 8, 2010, now Pat. No. 8,364,994.

(51) Int. Cl.
*G06F 1/26* (2006.01)
*G06F 1/32* (2006.01)
(Continued)

(52) U.S. Cl.
CPC ........... *G06F 1/3234* (2013.01); *G06F 3/1296* (2013.01); *H04N 1/00885* (2013.01); *H04N 1/00896* (2013.01); *H04N 2201/0094* (2013.01)

(58) Field of Classification Search
CPC .. G06F 1/3234; G06F 3/1296; H04N 1/00885; H04N 1/00896; H04N 2201/0094
See application file for complete search history.

(56) References Cited

U.S. PATENT DOCUMENTS 4,881,205 A * 11/1989 Aihara .................. G11C 11/406
  365/222
5,659,763 A * 8/1997 Ohashi .......................... 713/320
(Continued)

FOREIGN PATENT DOCUMENTS

CN       100530043      8/2009
EP       1 035 499      3/2000
(Continued)

OTHER PUBLICATIONS

Chinese Office Action issued Mar. 24, 2014 in corresponding Chinese Patent Application No. 201010275537.0.
(Continued)

*Primary Examiner* — Mark Connolly

(57) ABSTRACT

An image forming apparatus includes a volatile memory and System-on-Chip (SoC) part. The SoC part includes an internal memory, a CPU for accessing the volatile memory in the normal mode; an interface part for receiving a external signal, and a control part for, when the interface part has no input during a first preset time, copying information stored to the volatile memory to the internal memory and converting to a first power saving mode to lower an operating frequency of the volatile memory and an operating frequency of the CPU, and when a normal mode switch signal is not input during a second preset time in the first power saving mode, controlling the CPU to access the information copied to the internal memory and converting to a second power saving mode to change the volatile memory to a self-refresh mode.

10 Claims, 10 Drawing Sheets

(51) Int. Cl.
*H04N 1/00* (2006.01)
*G06F 3/12* (2006.01)

(56) References Cited

U.S. PATENT DOCUMENTS

| | | | | |
|---|---|---|---|---|
| 5,710,929 | A * | 1/1998 | Fung | 713/322 |
| 5,721,935 | A * | 2/1998 | DeSchepper et al. | 713/323 |
| 6,266,776 | B1 | 7/2001 | Sakai | |
| 6,571,333 | B1 | 5/2003 | Jain et al. | |
| 6,782,472 | B2 | 8/2004 | Jain et al. | |
| 6,874,095 | B2 * | 3/2005 | Usui | 713/320 |
| 7,548,481 | B1 * | 6/2009 | Dewey | G11C 5/147 |
| | | | | 365/227 |
| 7,908,502 | B2 | 3/2011 | Park | |
| 7,913,103 | B2 * | 3/2011 | Gold et al. | 713/501 |
| 8,339,626 | B2 * | 12/2012 | Park et al. | 358/1.13 |
| 8,364,994 | B2 * | 1/2013 | Park et al. | 713/320 |
| 8,610,917 | B2 * | 12/2013 | Park et al. | 358/1.13 |
| 8,824,222 | B2 * | 9/2014 | Ware | G06F 1/3275 |
| | | | | 365/191 |
| 2003/0172313 | A1 | 9/2003 | Jain et al. | |
| 2004/0044917 | A1 | 3/2004 | Lee et al. | |
| 2004/0225907 | A1 | 11/2004 | Jain et al. | |
| 2007/0208960 | A1 | 9/2007 | Yamada et al. | |
| 2008/0034240 | A1 | 2/2008 | Park | |
| 2009/0055665 | A1 | 2/2009 | Maglione et al. | |
| 2009/0125739 | A1 | 5/2009 | Satoh | |
| 2009/0204835 | A1 | 8/2009 | Smith et al. | |
| 2009/0204837 | A1 | 8/2009 | Raval et al. | |
| 2009/0213125 | A1 | 8/2009 | Shibasaki | |
| 2010/0268973 | A1 | 10/2010 | Park | |
| 2011/0138201 | A1 | 6/2011 | Park | |
| 2011/0252180 | A1 * | 10/2011 | Hendry | G06F 1/3203 |
| | | | | 711/3 |

FOREIGN PATENT DOCUMENTS

| | | |
|---|---|---|
| EP | 1 884 868 | 7/2007 |
| JP | 2002-333933 | 11/2002 |
| KR | 10-2008-0012548 | 2/2008 |
| WO | WO 01/33322 | 5/2001 |
| WO | WO 2009/035254 | 3/2009 |

OTHER PUBLICATIONS

Notice of Allowance issued in copending U.S. Appl. No. 12/877,757 mailed Sep. 25, 2012.
U.S. Appl. No. 12/877,757, filed Sep. 8, 2010, Man-suk Park, Samsung Electronics Co., Ltd.
Extended European Search Report issued Jan. 7, 2013 for European Patent Application No. 10175783.9.

* cited by examiner

IMAGE FORMING APPARATUS AND POWER CONTROL METHOD THEREOF

CROSS-REFERENCE TO RELATED APPLICATIONS

This application is a continuation of U.S. Ser. No. 12/877,757, filed Sep. 8, 2010, which claims priority from Korean Patent Application Nos. 10-2009-0084312 filed on Sep. 8, 2009 and 10-2010-0055575 filed on Jun. 11, 2010 in the Korean Intellectual Property Office, the disclosures of which are incorporated herein by reference.

BACKGROUND

1. Field

Apparatuses and methods consistent with the present disclosure relate an image forming apparatus and a method for controlling power of the image forming apparatus. More specifically, the present disclosure relates to an image forming apparatus for reducing power consumption in a power saving mode, and a control method of the image forming apparatus.

2. Description of the Related Art

Image forming apparatuses function to generate, print, receive and transmit image data. Their representative examples can include printers, scanners, copiers, fax machines, and multifunction devices combining functions of the printer, the scanner, the copier, and the fax machine.

Recently, attempts are being made to reduce power consumption in a normal mode in which the image forming apparatus normally operates, and to reduce a standby power consumed in a power saving mode in which the image forming apparatus performs no particular job.

The standby power indicates the power consumed always regardless of normal functions in the image forming apparatus.

In particular, recent policies are trying to limit the standby power into a specific range. The importance of the standby power is growing to the extent that products consuming high standby power may not be produced in the future.

SUMMARY

The present disclosure has been provided to address the above-mentioned and other problems and disadvantages occurring in the conventional arrangement, and an aspect of the present disclosure provides an image forming apparatus for operating using a volatile memory in a normal mode and copying and using information stored to the volatile memory to an internal memory by switching to power saving modes by stages according to the input status of an external signal.

According to an aspect of the present disclosure, an image forming apparatus includes a volatile memory; and a System-On-Chip (SoC) part for operating using the volatile memory in a normal mode, copying and using information stored to the volatile memory to an internal memory by switching to power saving modes by stages according to input status of an external signal, and reactivating the volatile memory when returning to the normal mode. The SoC part includes the internal memory; a central processing unit (CPU) for accessing the volatile memory in the normal mode; an interface part for receiving the external signal; and a control part for, when the interface part has no input during a first preset time, copying information stored to the volatile memory to the internal memory and converting to a first power saving mode to lower an operating frequency of the volatile memory and an operating frequency of the CPU, and when a normal mode switch signal is not input during a second preset time in the first power saving mode, controlling the CPU to access the information copied to the internal memory and converting to a second power saving mode to change the volatile memory to a self-refresh mode.

When an external signal other than the normal mode switch signal is received, the control part may keep the volatile memory in the self-refresh mode.

In the first power saving mode, the control part may lower the operating frequency of the volatile memory to a minimum memory operating frequency, and lower the operating frequency of the CPU to a first CPU operating frequency which is preset for the first power saving mode.

The image forming apparatus may further include a function part disposed in the SoC part and performing a preset function; at least one operating module for carrying out an operation corresponding to a function of the image forming apparatus; and a power source part for supplying power to the SoC part and the at least one operating module. When the normal mode switch signal is not input during a third preset time in the second power saving mode, the control part may convert to a third power saving mode, lower the operating frequency of the CPU from the first CPU operating frequency to a minimum CPU operating frequency, and control the power source part to shut down the power supplied to the function part and the at least one operating module.

When the normal mode switch signal is not input during a fourth preset time in the third power saving mode, the control part may convert to a fourth power saving mode and control the power source part to shut down the power supplied to the volatile memory.

When the normal mode switch signal is input through the interface part in the first power saving mode, the control part may adjust the operating frequency of the volatile memory from the minimum memory operating frequency to a normal memory operating frequency, and adjust the operating frequency of the CPU from the first CPU operating frequency to a normal CPU operating frequency.

When the normal mode switch signal is input through the interface part in the second power saving mode, the control part may adjust the operating frequency of the volatile memory from the minimum memory operating frequency to a normal memory operating frequency, adjust the operating frequency of the CPU from the first CPU operating frequency to a normal CPU operating frequency, and change the volatile memory from the self-refresh mode to a normal operation mode so that the CPU accesses the volatile memory.

When the normal mode switch signal is input through the interface part in the third power saving mode, the control part may adjust the operating frequency of the volatile memory from the minimum memory operating frequency to a normal memory operating frequency, adjust the operating frequency of the CPU from the minimum CPU operating frequency to a normal CPU operating frequency, control the power source part to supply the power to the function part and the at least one operating module, and changes the volatile memory from the self-refresh mode to a normal operation mode.

The image forming apparatus may further include a non-volatile memory for storing booting information. When the normal mode switch signal is input through the interface part in the fourth power saving mode, the control part may adjust the operating frequency of the CPU from the minimum CPU operating frequency to a normal CPU operating frequency, control the power source part to supply the power to the function part and the at least one operating module, and copy the booting information from the non-volatile memory to the volatile memory.

The SoC part may further include a phase-locked loop (PLL) part for generating different operating frequencies and providing the generated operating frequencies to the CPU, the volatile memory, and the interface part.

According to the aspect of the present disclosure, a power control method of an image forming apparatus which includes a volatile memory and an SoC part for operating using the volatile memory in a normal mode, includes when no external signal is input during a first preset time in the normal mode, copying information stored to the volatile memory to an internal memory of the SoC part and converting to a first power saving mode to lower an operating frequency of the volatile memory and an operating frequency of a CPU of the SoC part; when a normal mode switch signal is not input during a second preset time in the first power saving mode, operating the SoC part using the information copied to the internal memory and converting to a second power saving mode to change the volatile memory to a self-refresh mode; and when the normal mode switch signal is input in the first power saving mode or the second power saving mode, returning to the normal mode to reactive the volatile memory.

In the second power saving mode, even when an external signal other than the normal mode switch signal is input, the volatile memory may stay in the self-refresh mode.

In the first power saving mode, the operating frequency of the volatile memory may be lowered to a minimum memory operating frequency, and the operating frequency of the CPU may be lowered to a first CPU operating frequency which is preset for the first power saving mode.

The power control method may further include when the normal mode switch signal is not input during a third preset time in the second power saving mode, lowering the operating frequency of the CPU from the first CPU operating frequency to a minimum CPU operating frequency, and converting to a third power saving mode which shuts down power supplied to a function part disposed in the SoC part and performing preset functions and at least one operating module for performing an operating corresponding to the function of the image forming apparatus.

The power control method may further include when the normal mode switch signal is not input during a fourth preset time in the third power saving mode, converting to a fourth power saving mode to shut down the power supplied to the volatile memory.

When the normal mode switch signal is input in the first power saving mode, the returning to the normal mode may adjust the operating frequency of the volatile memory from the minimum memory operating frequency to a normal memory operating frequency, and adjust the operating frequency of the CPU from the first CPU operating frequency to a normal CPU operating frequency.

When the normal mode switch signal is input in the second power saving mode, the returning to the normal mode may adjust the operating frequency of the volatile memory from the minimum memory operating frequency to a normal memory operating frequency, adjust the operating frequency of the CPU from the first CPU operating frequency to a normal CPU operating frequency, and switch the volatile memory from the self-refresh mode to a normal mode so that the CPU accesses the volatile memory.

The power control method may further include when the normal mode switch signal is input in the third power saving mode, returning to the normal mode by adjusting the operating frequency of the volatile memory from the minimum memory operating frequency to a normal memory operating frequency, adjusting the operating frequency of the CPU from the minimum CPU operating frequency to a normal CPU operating frequency, supplying the power to the function part and the at least one operating module, and switching the volatile memory from the self-refresh mode to a normal operation mode.

The power control method may further include when the normal mode switch signal is input in the fourth power saving mode, returning to the normal mode by adjusting the operating frequency of the CPU from the minimum CPU operating frequency to a normal CPU operating frequency, supplying the power to the function part and the at least one operating module, and copying booting information prestored to a non-volatile memory to the volatile memory.

According to the aspect of the present disclosure, a storage medium contains a program code to execute a power control method of an apparatus which includes a volatile memory and an SoC part operating using the volatile memory in a normal mode. The power control method includes when no external signal is input during a first preset time in the normal mode, copying information stored to the volatile memory to an internal memory of the SoC part and converting to a first power saving mode to lower an operating frequency of the volatile memory and an operating frequency of a CPU of the SoC part; when a normal mode switch signal is not input during a second preset time in the first power saving mode, operating the SoC part using the information copied to the internal memory and converting to a second power saving mode to change the volatile memory to a self-refresh mode; and when the normal mode switch signal is input in the first power saving mode or the second power saving mode, returning to the normal mode to reactive the volatile memory.

According to the aspect of the present disclosure, an SoC unit used in an apparatus including a volatile memory includes an internal memory; a CPU for accessing the volatile memory in a normal mode; an interface part for receiving an external signal; and a control part for, when the interface part has no input during a first preset time, copying information stored to the volatile memory to the internal memory and converting to a first power saving mode to lower an operating frequency of the volatile memory and an operating frequency of the CPU, and when a normal mode switch signal is not input during a second preset time in the first power saving mode, conducting program jump to make the CPU access the information copied to the internal memory, and converting to a second power saving mode to change the volatile memory to a self-refresh mode.

BRIEF DESCRIPTION OF THE DRAWINGS

These and/or other aspects of the present disclosure will become more apparent and more readily appreciated from the following description of exemplary embodiments thereof, with reference to the accompanying drawings, in which.

DETAILED DESCRIPTION

Figure 1:
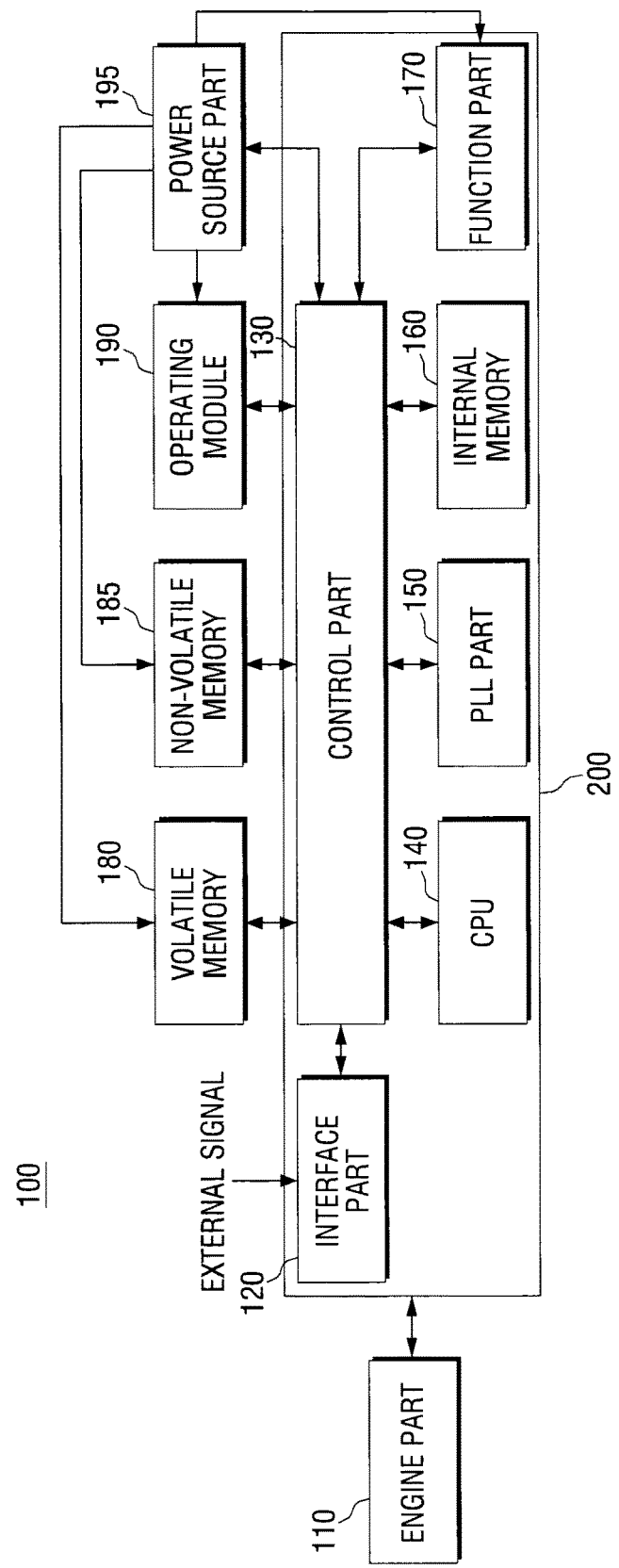
FIG. 1 illustrates an image forming apparatus according to an exemplary embodiment.

Certain exemplary embodiments of the present disclosure will now be described in greater detail with reference to the accompanying drawings.

In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail, since they would obscure the invention in unnecessary detail.

FIG. 1 depicts an image forming apparatus according to an exemplary embodiment.

Referring to FIG. 1, the image forming apparatus 100 includes an engine part 110, an interface part 120, a control part 130, a CPU 140, a PLL part 150, an internal memory 160, a function part 170, a volatile memory 180, a non-volatile memory 185, an operating module 190, and a power source part 195.

The interface part 120, the control part 130, the CPU 140, the PLL part 150, the internal memory 160, and the function part 170 of the image forming apparatus 100 constitute an SoC part 200.

The SoC part 200 operates using the volatile memory 180 in a normal mode, and switches to a power saving mode step by step according to the situation. In the power saving mode, the SoC part 200 can copy and use information stored to the volatile memory 180 into the internal memory 160 of the SoC part 200. When returning to the normal mode, the SoC part 200 can re-activate and reuse the volatile memory 180.

The SoC part 200 can be implemented using a single chip such as Application-Specific Integrated Circuit (ASIC) chip. Accordingly, the image forming apparatus 100 can realize a System on Chip (SoC).

The engine part 110 performs image forming jobs such as printing, scanning, and copying, by communicating with the SoC part 200.

The interface part 120 receives an external signal.

The external signals received at the interface part 120 can include a signal received from a host device (not shown) connected with the image forming apparatus 100 over a wireless/wired network, a signal received from an Universal Serial Bus (USB) device such as USB memory, a signal received from a user interface (UI) part (not shown) of the image forming apparatus 100 including a touch screen and a manipulation panel, a signal input from at least one sensor deployed in a region of the image forming apparatus 100, and a user signal input from a user.

The external signals received at the interface part 120 can include, for example, a signal instructing to switch from various power saving modes to the normal mode; that is, a normal mode switch signal.

The control part 130 carries out overall control operations. More specifically, the control part 130 can conduct any one of the memory control, the power control, and the main control according to a command of the CPU 140.

The control part 130 can include a memory controller (not shown), a power controller (not shown), and a main controller (not shown). Each controller can be implemented using a single device. The memory controller controls operations of various memories such as volatile memory 180 and non-volatile memory 185. The power controller controls to supply and to shut down the power for the components. The main controller controls other various components. While the single control part 130 processes all of the operations of the above-stated components in the drawing, a plurality of control parts can be provided according to the functions for those various exemplary embodiments.

The control part 130 can function as the memory controller to change the operating frequency of the volatile memory 180, to change the operating frequency of the signal output from the interface part 120, to switch the volatile memory 180 from the normal mode to a self-refresh mode (i.e., an idle mode) or vise versa, to stay in the self-refresh mode, or to initialize the volatile memory 180.

The control part 130 can function as the power controller to switch on and off the power applied to the function part 170, the volatile memory 180, the non-volatile memory 185, the operating module 190, and the memory controller.

Besides, the control part 130 can function as the main controller to control to operate the CPU 140 using the information copied to the internal memory 160 when the information stored to the volatile memory 180 is copied to the internal memory 160, to control to operate the CPU 140 using the information stored to the volatile memory 180, to copy information required for the normal mode operation from the non-volatile memory 185 to the volatile memory 180, or to change the operating frequency of the CPU 140.

When an external signal other than the normal mode switch signal is received at the interface part 120, the control part 130 can keep the volatile memory 180 in the self-refresh mode.

The CPU 140 can give commands to the control part 130 so that the components of the image forming apparatus 100 perform the corresponding operation. In more detail, the CPU 140 access the volatile memory 180 in the normal mode and in the first power saving mode, and accesses the internal memory 160 in the second, third, and fourth power saving modes.

The CPU 140 determines whether to switch from the normal mode to the power saving mode, from the power saving mode to the normal mode, or between the various power saving modes, by comprehensively considering the external signal input to the interface part 120, the type of the external signal, and the elapse of a preset time.

The power saving mode can include a plurality of the power saving modes divided by stages based on the power consumption level. While four power saving modes are illustrated here, the power saving mode is not limited to the four power saving modes.

The power saving mode keeps the SoC part 200, or the SoC part 200 and the volatile memory 180, the non-volatile memory 185, the operating module 190 and the power source part 195 outside the SoC part 200 in the low power state, regardless of the operation of the engine part 110.

That is, the power saving mode can be the opposite mode of the normal mode where the image forming apparatus 100 performs the printing, the scanning, and the copying based on the signal input to the interface part 120.

The PLL part 150 generates diverse operating frequencies.

For example, the PLL part 150 can generate the normal operating frequency 600 MHz, the first operating frequency 133 MHz, and the minimum operating frequency 33 MHz of the CPU 140. The PLL part 150 can generate the normal operating frequency 300 MHz and the minimum operating frequency 133 MHz of the volatile memory 180. Also, the PLL part 150 may be able to generate 166 MHz and 41.5 MHz which are the operating frequencies of the signal output from the interface part 120.

Yet, the above-mentioned frequencies are exemplary and can vary according to the types of the CPU 140 and the volatile memory 180.

The PLL part 150 can provide the generated operating frequencies to the interface part 120, the CPU 140, and the volatile memory 180.

The internal memory 160 is deployed inside the SoC part 200.

The internal memory 160 can store a program for switching the volatile memory 180 to the self-refresh mode, a program for controlling the PLL part 150 to change the frequency, a program for analyzing (or determining) the external signal input through the interface part 120, a program for returning from the power saving mode to the normal mode, information relating to a predefined time to switch from the normal mode to the power saving mode, information relating to a condition for switching between the various power saving modes, and information of the frequency to change.

Herein, the type of the information can vary regardless of the term such as program, code, and data.

The internal memory 160 can be a small-capacity volatile memory, and can be implemented using static random access memory (SRAM).

Meanwhile, when the image forming apparatus 100 is in the normal mode, the CPU 140 operates (i.e., accesses the program) using the program stored to the volatile memory 180. Thus, the internal memory 160 can store information for the various operations of the function part 170.

In so doing, when the image forming apparatus 100 converts to the first power saving mode, various information stored to the volatile memory 180 in the normal mode are duplicated and stored to the internal memory 160. Hence, in the power saving mode, the CPU 140 can perform only the minimum operation required, using the internal memory 160 of the relatively lower power consumption than the volatile memory 180.

The function part 170 is deployed in the SoC part 200, and conducts preset functions.

The function part 170 carries out various functions, for example, processes the image and compresses or decompresses the image, to process the image forming job such as printing, copying, and scanning of the engine part 110.

The volatile memory 180 is disposed outside the SoC part 200. Since the volatile memory 180 has the capacitance component, the volatile memory 180 itself can be discharged as the time passes by. To keep the stored data, the volatile memory 180 refreshes.

When the image forming apparatus 100 is in the normal mode, the volatile memory 180 operates in the normal operation mode by receiving a command (i.e., a signal) for the refresh of the volatile memory 180 from the external control part 130. In this case, the CPU 140 can perform the overall control operation by reading the information stored to the volatile memory 180.

When the image forming apparatus 100 converts to the power saving mode, the volatile memory 180 operates in the self-refresh mode in which the volatile memory 180 refreshes by itself. Accordingly, the volatile memory 180 does not need to receive a refresh command from the external control part 130 to refresh at the preset time intervals.

The volatile memory 180 has relatively higher capacity than the internal memory 160, and can be implemented using DRAM.

The non-volatile memory 185 is disposed outside the SoC part 200, and stores booting information. The non-volatile memory 185 can be implemented using ROM. To change the volatile memory 180 turned off in the various power saving modes back to the normal mode by supplying the power, the non-volatile memory 185 provides the volatile memory 180 with information required for the switch to the normal mode.

The operating module 190 performs the operation corresponding to the function of the image forming apparatus 100. The operating module 190 can include various function parts not included to the function part 170 due to the capacity limitation of the function part 170. The operating module 190 can include at least one function module. The at least one function module can be implemented using a single chip.

The power source part 195 supplies the power to the components in the SoC part 200 and the components outside the SoC part 200.

The image forming apparatus 100, specifically, the SoC part 200 is switched between the normal mode and the plurality of the power saving modes and performs the operation corresponding to the switched mode.

In more detail, when no external signal is input at all during a first preset time in the normal mode, the SoC part 200 enters the first power saving mode.

Next, when the normal mode switch signal is not input during a second preset time, the SoC part 200 enters the second power saving mode.

When the normal mode switch signal is not input during a third preset time, the SoC part 200 enters the third power saving mode. When the normal mode switch signal is not input during a fourth time in the third power saving mode, the SoC part 200 enters the fourth power saving mode. The first through fourth times may be set to various time values, and all or some of the first through fourth times may be identical or the first through fourth times may be different from one another.

In any one of the various power saving modes as described above, when the normal mode switch signal is input, the SoC part 200 returns to the normal mode and reactivates the volatile memory 180. That is, the CPU 140 of the SoC part 200 accesses the volatile memory 180 again to operate.

Figure 2:
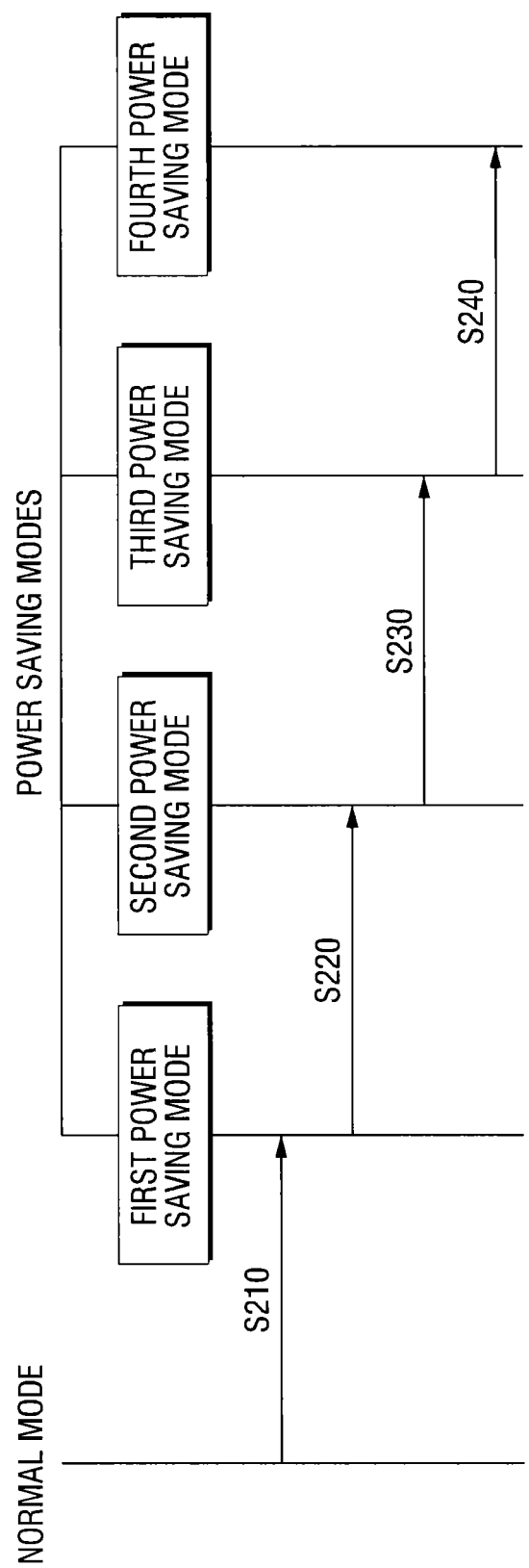
FIG. 2 illustrates step-by-step conversions from a normal mode to various power saving modes.

FIG. 2 illustrates the step-by-step conversions from the normal mode to the various power saving modes.

Referring to FIG. 2, the power saving modes can include the first power saving mode, the second power saving mode, the third power saving mode, and the fourth power saving mode.

Normal Mode

In the normal mode, the image forming apparatus 100 can consume the power of about 3.67 W at the SoC part 200.

First Power Saving Mode

In the normal mode, when the interface part 120 has no input during the first preset time, the image forming apparatus 100 converts from the normal mode to the first power saving mode (S210).

In the first power saving mode, the control part 130 duplicates the information stored to the volatile memory 180 to the internal memory 160, lowers the operating frequency of the volatile memory 180 to the minimum operating frequency, and lowers the operating frequency of the CPU 140 to the first operating frequency according to the command of the CPU 140.

For example, when the operating frequency of the volatile memory 180 is 300 MHz, the minimum operating frequency of the volatile memory 180 can be 133 MHz. For example, when the operating frequency of the CPU 140 is 600 MHz, the first operating frequency of the CPU 140 can be 133 MHz.

Hence, the power consumed by the SoC part 200 in the first power saving mode can be about 1.3 W ~1.4 W.

Second Power Saving Mode

In the first power saving mode, when the CPU 140 determines no input of the external signal instructing to enter the normal mode; that is, the normal mode switch signal in the second preset time, the image forming apparatus 100 converts from the first power saving mode to the second power saving mode (S220).

In the second power saving mode, the control part 130 performs the program jump so that the CPU 140 operates using the information copied to the internal memory 160, and switches the volatile memory 180 from the normal operation mode to the self-refresh mode according to the command of the CPU 140.

In so doing, when the CPU 140 determines that the interface part 120 does not receive the external signal instructing to switch the second power saving mode to the normal mode, the volatile memory 180 can sustain the self-refresh mode although other external signal is received.

Thus, since the CPU 140 can operate by accessing the small-capacity internal memory 160, the power consumption can be more reduced. Consequently, the power consumed by the SoC part 200 in the second power saving mode can be about 0.9 W ~1 W.

Third Power Saving Mode

In the second power saving mode, when the CPU 140 determines no input of the external signal instructing to enter the normal mode; that is, the normal mode switch signal in the third preset time, the image forming apparatus 100 converts from the second power saving mode to the third power saving mode (S230).

In the third power saving mode, the control part 130 can lower the operating frequency of the CPU 140 to the minimum operating frequency and cut off the power supplied to the function part 170 and the operating module 190 according to the command of the CPU 140.

For example, when the first operating frequency of the CPU 140 is 133 MHz, the minimum operating frequency of the CPU 140 can be 33 MHz.

As the function part 170 and the operating module 190 are turned off and the operating frequency of the CPU 140 is lowered to the minimum operating frequency, the power consumption can be reduced further than the second power saving mode. The power consumed by the SoC part 200 in the third power saving mode can be about 0.6 W ~0.7 W. In result, the total power consumed by the image forming apparatus 100 in the third power saving mode can be reduced below 1 W or so.

Meanwhile, the power supplied to the function part 170 may be shut down in the second power saving mode. In the third power saving mode, the operating frequency of the signal received at the interface part 120 can be altered from 133 MHz to 33 MHz.

Fourth Power Saving Mode

In the third power saving mode, when the CPU 140 determines no input of the external signal instructing to enter the normal mode; that is, the normal mode switch signal in the fourth preset time, the image forming apparatus 100 converts from the third power saving mode to the fourth power saving mode (S240).

In the fourth power saving mode, according to the command of the CPU 140, the control part 130 cuts off the power supplied to the volatile memory 180.

Since the volatile memory 180 is turned off, the power consumption can be reduced further than the third power saving mode. The power consumed by the SoC part 200 in the fourth power saving mode can be about 0.4 W~0.5 W. Thus, the total power consumed by the image forming apparatus 100 in the fourth power saving mode can be reduced much below than 1 W or so.

To ease the understanding, the operating frequency used in the memory such as volatile memory 180 is referred to as a memory operating frequency, and the operating frequency used in the CPU 140 is referred to as a CPU operating frequency.

Note that the various operating frequencies and the power values as stated above are merely exemplary, and can vary according to the characteristics or the number of the components, and the characteristics of the image forming apparatus 100. That is, they are not limited to the numbers mentioned in the present disclosure.

In the exemplary embodiment of FIG. 2, when the preset condition is satisfied in each mode, the power control method of the image forming apparatus 100 proceeds, but not limited to, in the order of the normal mode, the first power saving mode, the second power saving mode, the third power saving mode, and the fourth power saving mode.

For instance, the image forming apparatus 100 can define a new power saving mode only by duplicating the information stored to the volatile memory 180 of the first power saving mode to the internal memory 160 and changing the volatile memory 180 to the self-refresh mode.

In this case, the new power saving mode can further include lowering the operating frequency of the volatile memory 180 to the minimum operating frequency and the operating frequency of the CPU 140 to the first operating frequency, and controlling to operate the CPU 140 using the information copied to the internal memory 160.

For example, without the fourth power saving mode, the first, second and third power saving modes can be progressed in order. Alternatively, the first power saving mode and the second power saving mode can be progressed together, and the third power saving mode and the fourth power saving mode can be progressed together. Alternatively, the first power saving mode and the second power saving mode can be progressed together, and the third power saving mode and the fourth power saving mode can be processed in order.

For example, when the condition for converting to the first power saving mode is satisfied in the normal mode, the power control method of the image forming apparatus 100 can automatically convert from the normal mode to the second power saving mode via the first power saving mode. Alternatively, when the condition for converting to the first power saving mode is satisfied in the normal mode, the power control method of the image forming apparatus 100 can automatically convert from the normal mode to the third power saving mode via the first power saving mode and the second power saving mode. Alternatively, when the condition for converting to the first power saving mode is satisfied in the normal mode, the power control method of the image forming apparatus 100 can automatically convert from the normal mode to the fourth power saving mode via the first power saving mode, the second power saving mode, and the third power saving mode.

Meanwhile, in the power control method of the image forming apparatus 100, part of the operations in each power saving mode can be carried out in the other power saving mode.

As stated above, the power control method of the image forming apparatus 100 can apply various combinations only if the image forming apparatus 100 converts from the normal mode to the power saving mode and works in the power saving mode.

Figure 3:
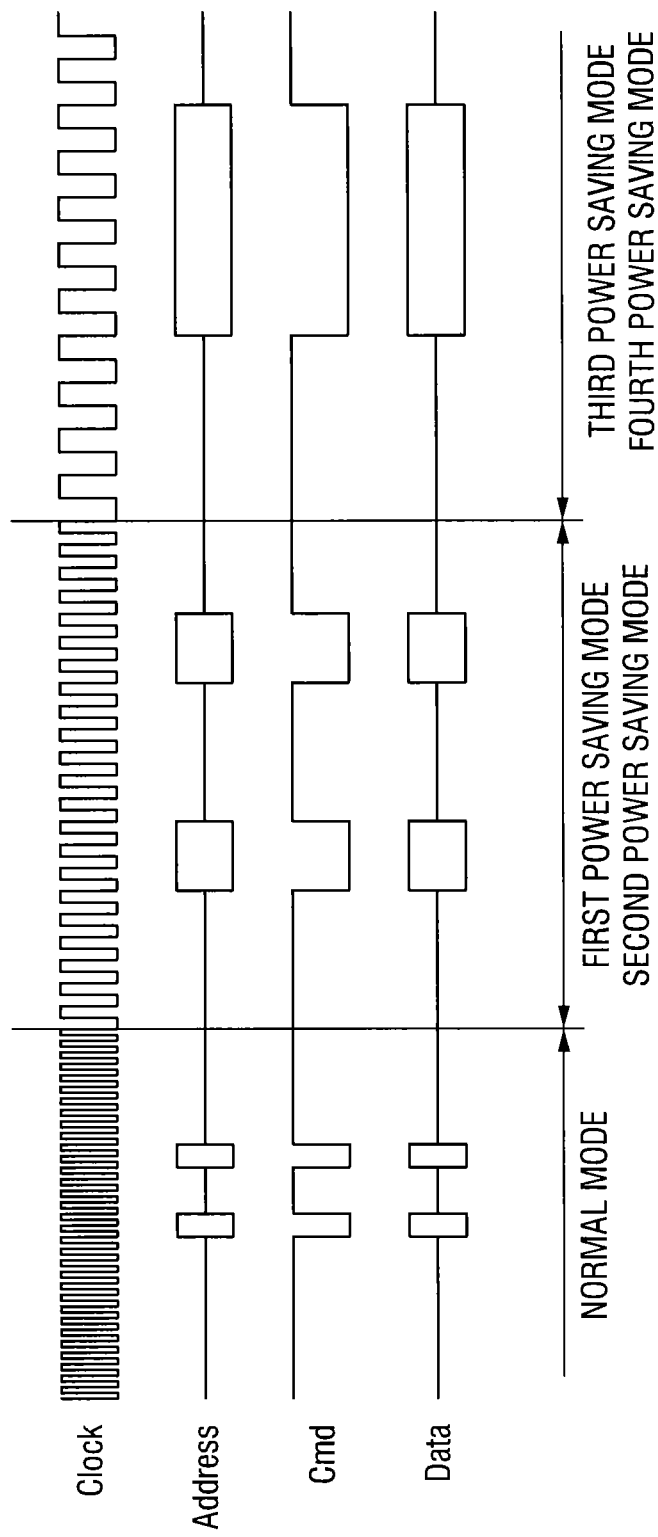
FIG. 3 illustrates various operating frequencies generated in a PLL part.

FIG. 3 illustrates various operating frequencies generated in the PLL part.

In FIG. 3, the clock, the address, the command, and the data are depicted. The PLL part 150 can generate diverse operating frequencies and provide the generated operating frequencies to the interface part 120, the CPU 140, and the volatile memory 180 respectively.

Particularly, FIG. 3 depicts examples of the operating frequency of the CPU 140.

In the normal mode, the operating frequency of the CPU 140 can be 600 MHz, the first operating frequency of the first power saving mode and the second power saving mode can be 133 MHz, and the minimum operating frequency of the third power saving mode and the fourth power saving mode can be 33 MHz.

Since the normal mode executes relatively more commands than the first power saving mode and the second power saving mode, the power consumption of the first power saving mode and the second power saving mode is lower than the power consumption of the normal mode.

Likewise, compared to the first power saving mode and the second power saving mode, the power consumption in the third power saving mode and the fourth power saving mode is relatively lower.

Hence, in the conversion from the second power saving mode to the third power saving mode, the power consumed by the SoC part 200 can be about 0.6 W ~0.7 W. Consequently, when the second power saving mode is switched to the third power saving mode, the total power consumed by the image forming apparatus 100 including the power consumed by the outer components of the SoC part 200, such as PHY chip, and the power consumed in the SoC part 200 can be below 1W.

In the meantime, when the image forming apparatus 100 converts from the normal mode to the first power saving mode, the operating frequency of the volatile memory 180 can be lowered to the minimum operating frequency.

Figure 4:
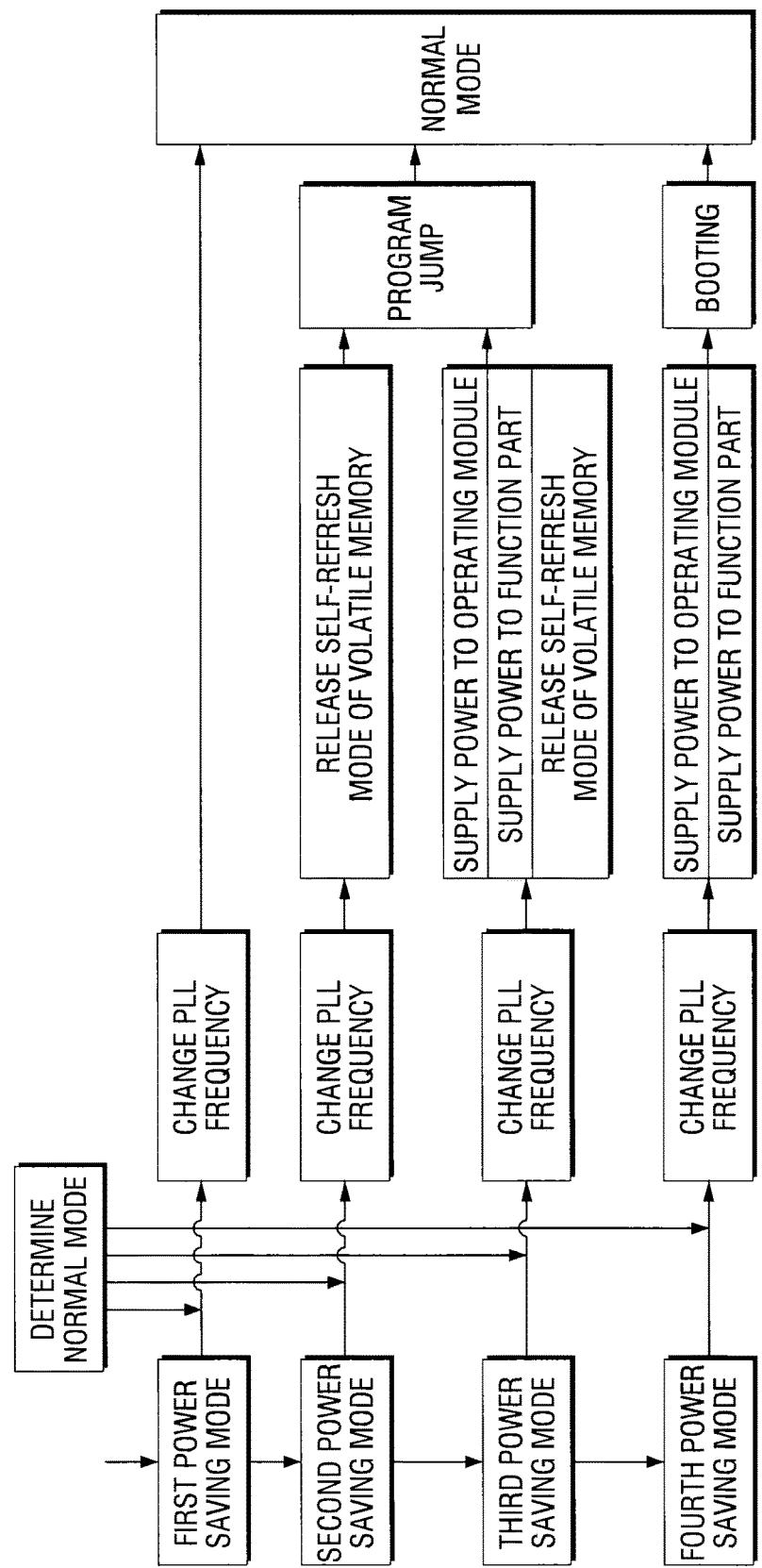
FIG. 4 illustrates the conversions from the various power saving modes of the image forming apparatus to the normal mode.

FIG. 4 illustrates the conversions from the various power saving modes of the image forming apparatus to the normal mode.

Referring to FIG. 4, the power saving mode can include the first power saving mode, the second power saving mode, the third power saving mode, and the fourth power saving mode.

Conversion from the Power Saving Mode to the Normal Mode

When the image forming apparatus 100 works in the first power saving mode and the CPU 140 determines the input of the external signal instructing to enter the normal mode, that is, the input of the normal mode switch signal to the interface part 120, the control part 130 can switch the image forming apparatus 100 to the normal mode by changing the operating frequency of the CPU 140 and the volatile memory 180 to 600 MHz and 300 MHz respectively according to the command of the CPU 140.

When the image forming apparatus 100 works in the second power saving mode and the CPU 140 determines the input of the external signal instructing to enter the normal mode; that is, the input of the normal mode switch signal to the interface part 120, the control part 130 changes the operating frequency of the CPU 140 and the volatile memory 180 to 600 MHz and 300 MHz respectively according to the command of the CPU 140. In addition, according to the command of the CPU 140, the control part 130 can change the volatile memory 180 to the normal operation mode by releasing the self-refresh mode of the volatile memory 180. Hence, the CPU 140 can work by accessing the program stored to the volatile memory 180, and the image forming apparatus 100 can enter the normal mode.

When the image forming apparatus 100 works in the third power saving mode and the CPU 140 determines the input of the external signal instructing to switch from the power saving mode to the normal mode; that is, the input of the normal mode switch signal to the interface part 120, the control part 130 changes the operating frequency of the CPU 140 and the volatile memory 180 to 600 MHz and 300 MHz respectively according to the command of the CPU 140. In addition, according to the command of the CPU 140, the control part 130 can supply the power to the function part 170 and the operating module 190 and release the self-refresh mode of the volatile memory 180 so that the CPU 140 using the program stored to the internal memory 160 in the third power saving mode can jump the program to use the program stored to the volatile memory 180. As a result, the image forming apparatus 100 can enter the normal mode.

When the image forming apparatus 100 works in the fourth power saving mode and the CPU 140 determines the input of the external signal instructing to enter the normal mode; that is, the input of the normal mode switch signal to the interface part 120, the control part 130 changes the operating frequency of the CPU 140 to the operating frequency of the normal mode, for example, to 600 MHz. According to the command of the CPU 140, the control part 130 supplies the power to the function part 170 and the operating module 190. The control part 130 initializes the volatile memory 180, and copies the necessary information for the normal mode; that is, the booting information from the non-volatile memory 185 to the volatile memory 180. Accordingly, in the conversion from the fourth power saving mode to the normal mode, the booting is carried out using the copied booting information. The booting when the volatile memory 180 is turned off and then turned on is the general job, and thus shall not be further explained.

As such, according to the booting operation, the time taken to switch from the fourth power saving mode to the normal mode can be longer than the time taken to switch from the third power saving mode to the normal mode, but the fourth power saving mode can reduce the power consumption further than the third power saving mode.

When the image forming apparatus 100 works in the fourth power saving mode and the control part 130 alters the frequency of the CPU 140, the minimum operating frequency of the volatile memory 180 may be changed to the normal operating frequency.

The External Signal Instructing to Switch from the Power Saving Mode to the Normal Mode For instance, the external signal instructing to switch from the power saving mode to the normal mode can be included to a signal transmitted from the host device (not shown) through the network interface of the image forming apparatus 100.

The interface part 120 of the image forming apparatus 100 can receive the external signal (i.e., packets) from the host device (not shown) with the communication scheme designated to the broadcast or the unicast.

The CPU 140 can check whether the external signal instructs to switch from the power saving mode to the normal mode, using the program (or information) stored to the internal memory 160. More specifically, the CPU 140 can examine whether a media access control (MAC) address of the external signal matches a MAC address of the image forming apparatus 100, using the program stored to the internal memory 160.

The MAC address of the external signal broadcast from the host device (not shown) may not mach the MAC address pre-stored to the image forming apparatus 100.

When the two MAC addresses match, the image forming apparatus 100 can enter the normal mode according to the signal instructing to switch from the power saving mode to the normal mode.

Conversely, when the MAC addresses do not match, the image forming apparatus 100 keeps the power saving mode without entering the normal mode. As such, the external signal is not the signal which commands to switch from the power saving mode to the normal mode.

By distinguishing, for example, a signal for the printing job of the unicast external signal, the CPU 140 can convert from the power saving mode to the normal mode and give the command for the image forming job to the engine part 110.

For example, the external signal instructing to switch from the power saving mode to the normal mode can be contained in a signal transmitted from the USB device (not shown) through the USB interface of the image forming apparatus 100.

In more detail, the signal transmitted from the USB device (not shown) can be a signal received from the USB device (not shown). For example, the signal can include a signal indicating the connection of the USB device and a signal (a command) instructing to print data in the USB device. The user can define this signal as the external signal instructing to switch from the power saving mode to the normal mode, and change the signal.

For example, the external signal instructing to switch from the power saving mode to the normal mode can be received at the interface part 120 by selecting a button of the UI part (not shown) of the image forming apparatus 100 or by touching a screen of the UI part (not shown).

For example, the external signal instructing to switch from the power saving mode to the normal mode can be input to the interface part 120 from a sensor of the image forming apparatus 100. The external signal instructing to switch from the power saving mode to the normal mode can be input from a sensor (not shown) which senses the attachment or the detachment of the function unit such as High Capacity Feeder (HCF).

Figure 5:
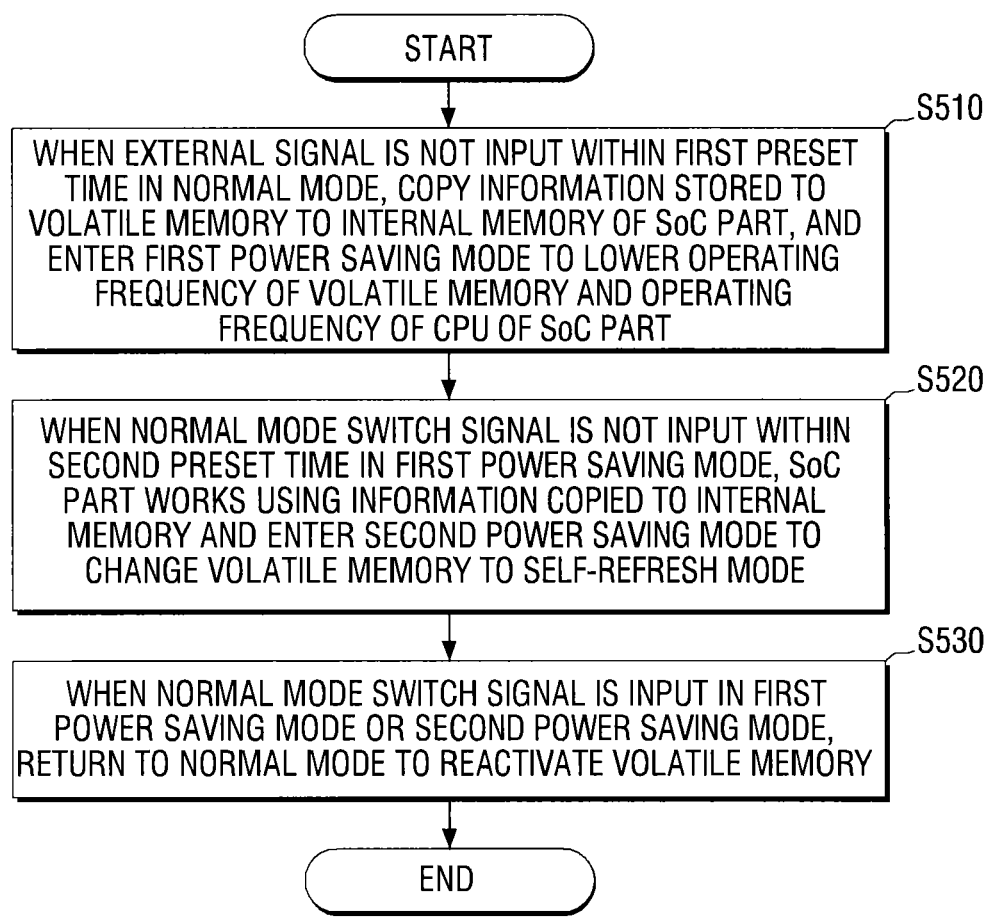
FIG. 5 is a flowchart of a power control method of the image forming apparatus according to an exemplary embodiment.

FIG. 5 is a flowchart of a power control method of the image forming apparatus according to an exemplary embodiment.

The image forming apparatus 100 includes the volatile memory 180 and the SoC part 200 which works using the volatile memory 180 in the normal mode.

When the external signal is not input within the first preset time in the normal mode, the power control method of the image forming apparatus 100 copies the information stored to the volatile memory 180 to the internal memory 160 of the SoC part 200, and enters the first power saving mode to lower the operating frequency of the volatile memory 180 and the operating frequency of the CPU 140 of the SoC part 200 (S510).

When the normal mode switch signal is not input within the second preset time in the first power saving mode, the SoC part 200 works using the information copied to the internal memory 160 and enters the second power saving mode to change the volatile memory 180 to the self-refresh mode (S520).

Next, when the normal mode switch signal is input in the first power saving mode or the second power saving mode, the method returns to the normal mode to reactivate the volatile memory 180 (S530).

Herein, the reactivation implies that the CPU 140 accesses the volatile memory 180.

According to the power control method of the image forming apparatus 100, the power consumed in the power saving mode can be far more reduced.

Figure 6:
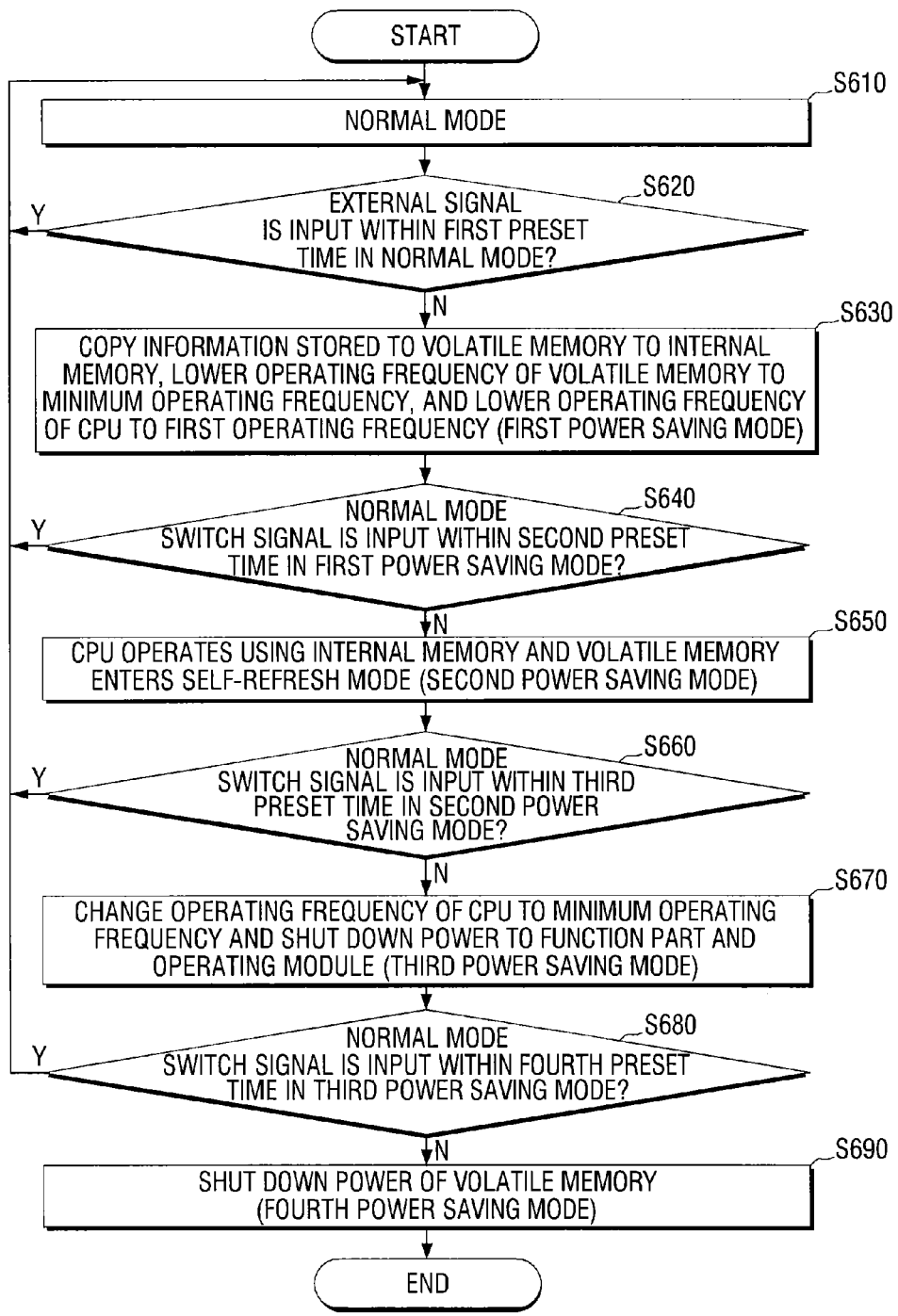
FIG. 6 is a flowchart of a power control method of the image forming apparatus according to another exemplary embodiment.

FIG. 6 is a flowchart of a power control method of the image forming apparatus according to another exemplary embodiment. To facilitate the understanding, it is assumed that the image forming apparatus 100 is in the normal mode.

According to the power control method of the image forming apparatus 100 in FIG. 6, when the image forming apparatus 100 is in the normal mode (S610), the CPU 140 determines whether the external signal is input to the interface part 120 within the first preset time in the normal mode (S620).

When the image forming apparatus 100 works in the normal mode and the external signal is input to the interface part 120 within the first preset time (S620-Y), the image forming apparatus 100 sustains the normal mode.

Conversely, when the external signal is not input to the interface part 120 within the first preset time (S620-N); that is, when the condition for entering the first power saving mode is satisfied, the image forming apparatus 100 copies the information stored to the volatile memory 180 to the internal memory 160 and the control part 130 lowers the operating frequency of the volatile memory 180 to the minimum operating frequency and the operating frequency of the CPU 140 to the first operating frequency according to the command of the CPU 140, which is the first power saving mode (S630).

When the image forming apparatus 100 is in the first power saving mode, the CPU 140 determines whether the normal mode switch signal instructing to enter the normal mode is input within the second preset time (S640).

When the CPU 140 determines that the normal mode switch signal instructing to enter the normal mode is input within the second preset time in the first power saving mode (S640-Y), the image forming apparatus 100 converts from the first power saving mode to the normal mode.

By contrast, when the CPU 140 determines that the normal mode switch signal instructing to enter the normal mode is not input within the second preset time in the first power saving mode (S640-N); that is, when the condition for entering the second power saving mode is satisfied, the program jump is carried out so that the CPU 140 accesses the internal memory 160 without accessing the volatile memory 180 and the control part 130 changes the volatile memory 180 to the self-refresh mode according to the command of the CPU 140, which is the second power saving mode (S650).

When the image forming apparatus 100 is in the second power saving mode, the CPU 140 determines whether the normal mode switch signal instructing to enter the normal mode is input within the third preset time (S660).

When the CPU 140 determines that the normal mode switch signal instructing to enter the normal mode is input within the third preset time in the second power saving mode (S660-Y), the image forming apparatus 100 converts from the second power saving mode to the normal mode.

By contrast, when the CPU 140 determines that the normal mode switch signal instructing to enter the normal mode is not input within the third preset time in the second power saving mode (S660-N), the control part 130 changes the operating frequency of the CPU 140 to the minimum operating frequency and shuts down the power to the function part 160 and the operating module 190 according to the command of the CPU 140, which is the third power saving mode (S670).

When the image forming apparatus 100 is in the third power saving mode, the CPU 140 determines whether the normal mode switch signal instructing to enter the normal mode is input within the fourth preset time (S680).

When the CPU 140 determines that the normal mode switch signal instructing to enter the normal mode is input within the fourth preset time in the third power saving mode (S680-Y), the image forming apparatus 100 converts from the third power saving mode to the normal mode.

By contrast, when the CPU 140 determines that the normal mode switch signal instructing to enter the normal mode is not input within the preset time in the third power saving mode (S680-N), the control part 130 shuts down the power to the volatile memory 180 according to the command of the CPU 140 which is the fourth power saving mode (S690), which is the fourth power saving mode.

The first through fourth preset times can be identical or different from each other. The first through fourth preset times can be stored to the internal memory 160 or the volatile memory 180, and can be modified by the user.

The power control method of the image forming apparatus 100 can switch from the normal mode to the first power saving mode, and from the first power saving mode to the second power saving mode, the third power saving mode, and the fourth power saving mode step by step. In so doing, the power consumption can be reduced further in the second power saving mode than the first power saving mode, further in the third power saving mode than the second power saving mode, and further in the fourth power saving mode than the third power saving mode.

In the third power saving mode, the power consumed by the SoC part 200 can be about 0.6 W ~0.7 W. Thus, the total power consumed by the image forming apparatus 100 can be reduced below 1 W or so.

Meanwhile, by receiving the user command through the UI part (not shown) of the image forming apparatus 100, the image forming apparatus 100 can change from the normal mode to the power saving mode, from the normal mode to the respective power saving modes immediately, or to the normal mode, the first power saving mode, the second power saving mode, the third power saving mode, and the fourth power saving mode in sequence.

Figure 7:
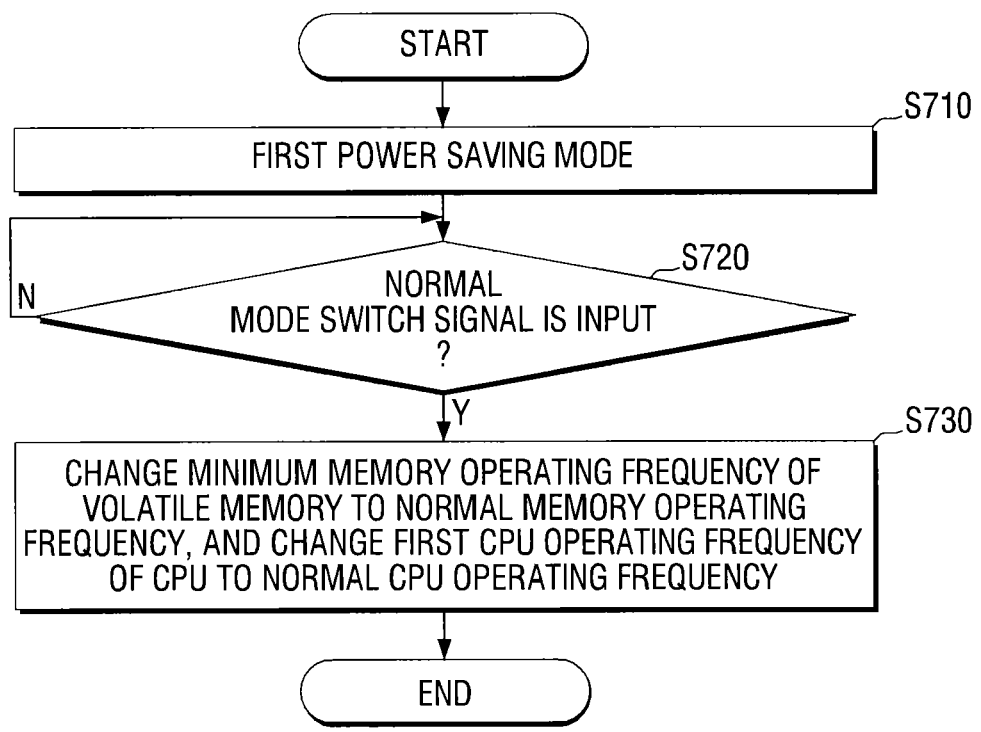
FIG. 7 is a flowchart of the power control method of the image forming apparatus according to an exemplary embodiment.

FIG. 7 is a flowchart of the power control method of the image forming apparatus according to an exemplary embodiment.

Conversion from the First Power Saving Mode to the Normal Mode

According to the power control method of the image forming apparatus 100 in FIG. 7, when the image forming apparatus 100 is working in the first power saving mode (S710), the CPU 140 determines whether the normal mode switch signal is input to the interface part 120 (S720).

When the normal mode switch signal is input to the interface part 120 (S720-Y), the control part 130 changes the minimum memory operating frequency of the volatile memory 180 to the normal memory operating frequency and changes the first CPU operating frequency of the CPU 140 to the normal CPU operating frequency according to the command of the CPU 140 (S730).

When the normal mode switch signal is not input to the interface part 120 (S720-N), the image forming apparatus 100 stands by until the normal mode switch signal is input.

Figure 8:
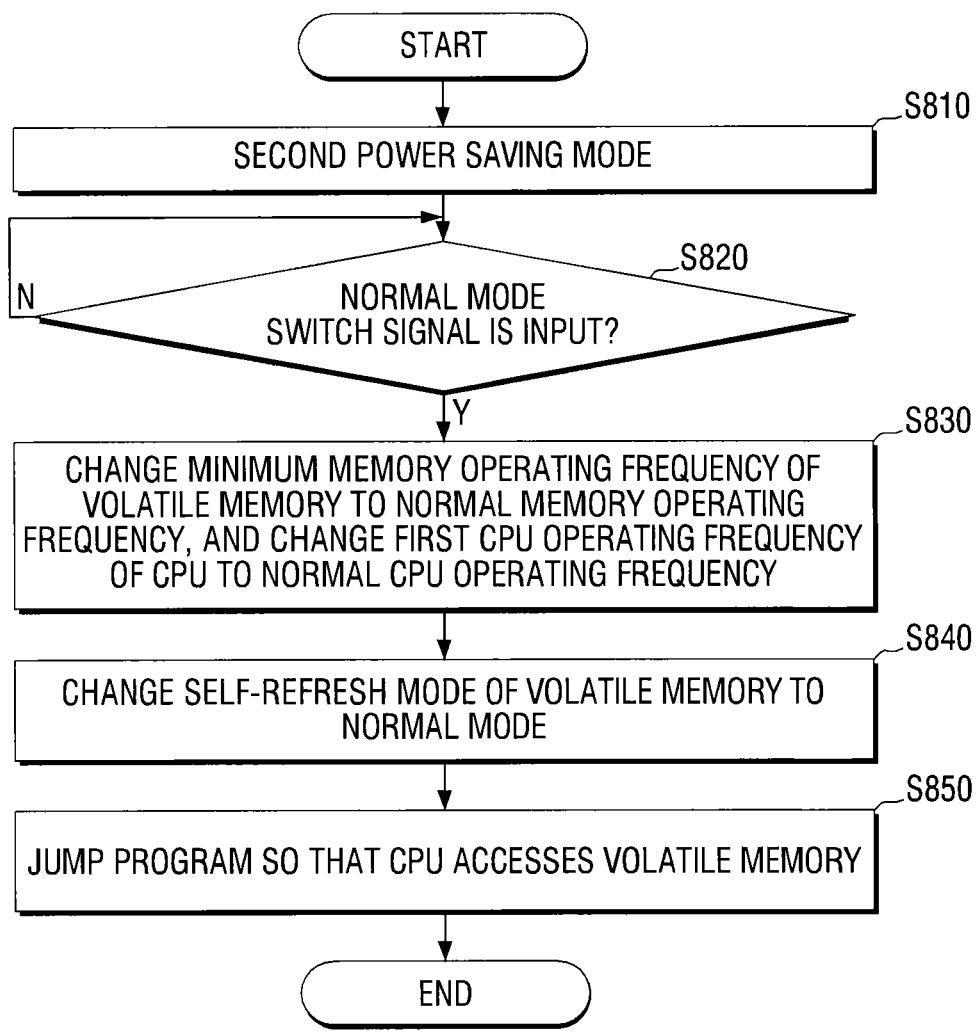
FIG. 8 is a flowchart of a power control method of the image forming apparatus according to another exemplary embodiment.

FIG. 8 is a flowchart of a power control method of the image forming apparatus according to another exemplary embodiment.

Conversion from the Second Power Saving Mode to the Normal Mode

According to the power control method of the image forming apparatus 100 in FIG. 8, when the image forming apparatus 100 is working in the second power saving mode (S810), the CPU 140 determines whether the normal mode switch signal is input to the interface part 120 (S820).

When the normal mode switch signal is input to the interface part 120 (S820-Y), the control part 130 changes the minimum memory operating frequency of the volatile memory 180 to the normal memory operating frequency and changes the first CPU operating frequency of the CPU 140 to the normal CPU operating frequency according to the command of the CPU 140 (S830).

When the normal mode switch signal is not input to the interface part 120 (S820-N), the image forming apparatus 100 stands by until the normal mode switch signal is input.

According to the command of the CPU 140, the control part 130 changes the self-refresh mode of the volatile memory 180 to the normal mode (S840).

In addition, the control part 130 performs the program jump so that the CPU 140 can access the volatile memory 180 (S850).

Figure 9:
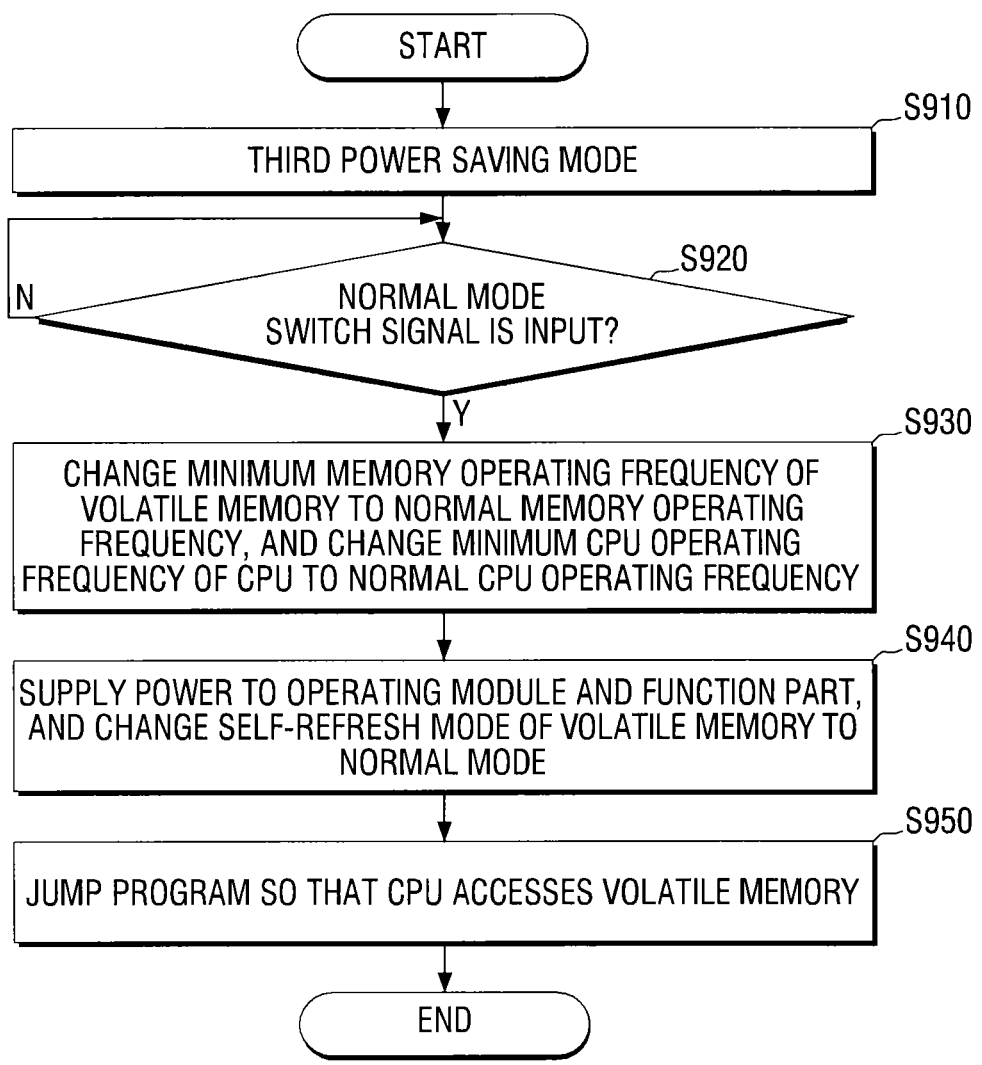
FIG. 9 is a flowchart of a power control method of the image forming apparatus according to yet another exemplary embodiment.

FIG. 9 is a flowchart of a power control method of the image forming apparatus according to yet another exemplary embodiment.

Conversion from the Third Power Saving Mode to the Normal Mode

According to the power control method of the image forming apparatus 100 in FIG. 9, when the image forming apparatus 100 is working in the third power saving mode (S910), the CPU 140 determines whether the normal mode switch signal is input to the interface part 120 (S920).

When the normal mode switch signal is input to the interface part 120 (S920-Y), the control part 130 changes the minimum memory operating frequency of the volatile memory 180 to the normal memory operating frequency and changes the minimum CPU operating frequency of the CPU 140 to the normal CPU operating frequency according to the command of the CPU 140 (S930).

When the normal mode switch signal is not input to the interface part 120 (S920-N), the image forming apparatus 100 stands by until the normal mode switch signal is input.

According to the command of the CPU 140, the control part 130 supplies the power to the function part 170 and the operating module 190, and changes the self-refresh mode of the volatile memory 180 to the normal mode (S940).

In addition, the control part 130 performs the program jump so that the CPU 140 can access the volatile memory 180 (S950).

Figure 10:
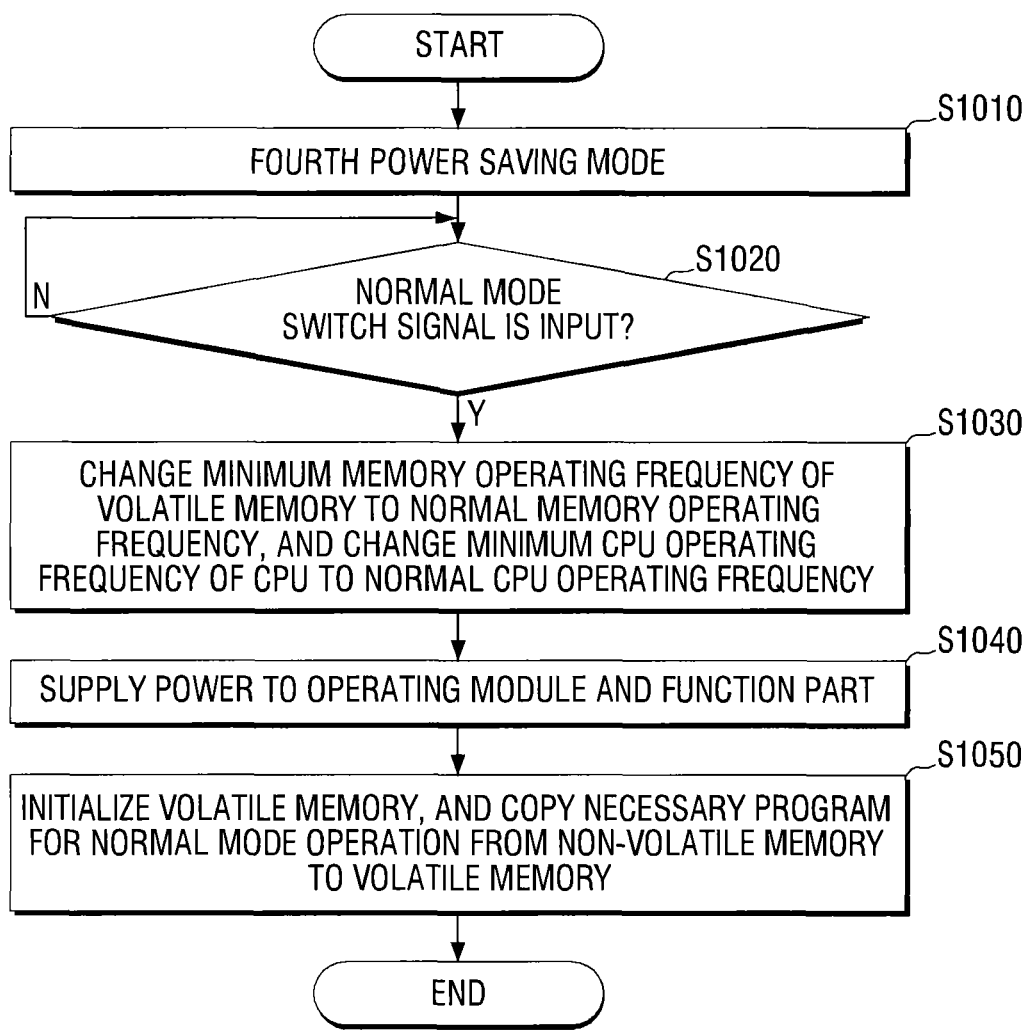
FIG. 10 is a flowchart of a power control method of the image forming apparatus according to still another exemplary embodiment.

FIG. 10 is a flowchart of a power control method of the image forming apparatus according to still another exemplary embodiment.

Conversion from the Fourth Power Saving Mode to the Normal Mode

According to the power control method of the image forming apparatus 100 in FIG. 10, when the image forming apparatus 100 is working in the fourth power saving mode (S1010), the CPU 140 determines whether the normal mode switch signal is input to the interface part 120 (S1020).

When the normal mode switch signal is input to the interface part 120 (S1020-Y), the control part 130 changes the minimum memory operating frequency of the volatile memory 180 to the normal memory operating frequency and changes the minimum CPU operating frequency of the CPU 140 to the normal CPU operating frequency according to the command of the CPU 140 (S1030).

When the normal mode switch signal is not input to the interface part 120 (S1020-N), the image forming apparatus 100 stands by until the external signal instructing to enter the normal mode is input.

According to the command of the CPU 140, the control part 130 supplies the power to the function part 170 and the operating module 190 (S1040).

According to the command of the CPU 140, the control part 130 also initializes the volatile memory 180, and conducts the booting process by copying the necessary program for the normal mode operation from the non-volatile memory 185 to the volatile memory 180 (S1050).

The present disclosure can include a storage medium; that is, a computer readable recording medium containing a program to execute the power control method of the image forming apparatus as aforementioned. The computer readable recording medium includes all kinds of the recording device containing data readable by the computer system. Examples of the computer readable recording medium include ROM, RAM, CD-ROM, magnetic tape, floppy disc, and optical data storage device. The computer readable recording medium can store and execute codes which can be distributed to computer systems linked via the network and read by the computer in the distributed manner.

The storage medium according to an exemplary embodiment contains a program code for executing the power control method of the apparatus including the volatile memory 180 and the SoC part 200 working using the volatile memory 180 in the normal mode. Herein, in the normal mode, the above-stated power control method includes copying the information stored to the volatile memory 180 to the internal memory 160 of the SoC part 200 and converting to the first power saving mode, when the external signal is not input within the first preset time in the normal mode, to lower the operating frequency of the volatile memory 180 and the operating frequency of the CPU 140 of the SoC part 200, operating the SoC part 200 using the information copied to the internal memory 160 and converting to the second power saving mode, when the normal mode switch signal is not input during the second preset time in the first power saving mode, to change the volatile memory 180 to the self-refresh mode, and returning to the normal mode, when the normal mode switch signal is input in the first power saving mode or the second power saving mode, to reactivate the volatile memory 180.

So far, while the present disclosure mainly explains the image forming apparatus including the SoC part and the volatile memory, the concept of the present disclosure can be applied to various apparatuses as well as the image forming apparatuses. The SoC part can be complemented using a single chip; that is, using an SoC unit. In this case, components of the SoC unit can be the same as in the SoC part 200 of FIG. 1.

In more detail, the SoC unit according to the exemplary embodiment is used in the apparatus including the volatile memory 180. The SoC unit includes the internal memory 160, the CPU 140 for accessing the volatile memory 180 in the normal mode, the interface part 120 for receiving the external signal, and the control part 130. When the interface part 120 has no input during the first preset time, the control part 130 copies the information stored to the volatile memory 180 to the internal memory and enters the first power saving mode to lower the operating frequency of the volatile memory 180 and the operating frequency of the CPU 140. When the normal mode switch signal is not input during the second preset time in the first power saving mode, the control part 130 performs the program jump so that the CPU 140 accesses the information copied to the internal memory 160, and enters the second power saving mode to switch the volatile memory 180 to the self-refresh mode.

While the present disclosure has been particularly shown and described with reference to exemplary embodiments thereof, it will be understood by those skilled in the art that various changes in form and details may be made therein without departing from the spirit and scope of the invention as defined by the appended claims.

What is claimed is:

1. An image forming apparatus having a plurality of power saving operation modes respectively using operating frequencies having different periods, comprising:
   a volatile memory configured to operate by the operating frequencies and a power; and
   a System-On-Chip (SoC) part including an internal memory,
   wherein the SoC part is configured to operate using the volatile memory in a normal mode, copy and use information stored in the volatile memory to the internal memory and lower an operating frequency of the volatile memory in a first power saving mode of the plurality of power saving modes, and lower the power supplied to the volatile memory in a second power saving mode of the plurality of power saving modes, and wherein the SoC part comprises
a central processing unit (CPU);
the internal memory;
an interface part to receive an external signal; and
a control part to, when the interface part has no input during a first preset time, copy information stored to the volatile memory to the internal memory and to convert to the first power saving mode to lower an operating frequency of the volatile memory and an operating frequency of the CPU, and when a normal mode switch signal is not input during a second preset time in the first power saving mode, to control the CPU to access the information copied to the internal memory and to convert to the second power saving mode to change the volatile memory to a self-refresh mode.

2. The image forming apparatus of claim 1, wherein, in the first power saving mode, the control part lowers the operating frequency of the volatile memory to a minimum memory operating frequency, and lowers the operating frequency of the CPU to a first CPU operating frequency which is preset for the first power saving mode.

3. The image forming apparatus of claim 2, further comprising:
a function part disposed in the SoC part and performing a preset function;
at least one operating module to carry out an operation corresponding to a function of the image forming apparatus; and
a power source part to supply power to the SoC part and the at least one operating module,
wherein, when the normal mode switch signal is not input during a third preset time in the second power saving mode, the control part converts to a third power saving mode, lowers the operating frequency of the CPU from the first CPU operating frequency to a minimum CPU operating frequency, and controls the power source part to shut down the power supplied to the function part and the at least one operating module.

4. The image forming apparatus of claim 3, wherein, when the normal mode switch signal is input through the interface part in the third power saving mode, the control part adjusts the operating frequency of the volatile memory from the minimum memory operating frequency to a normal memory operating frequency, adjusts the operating frequency of the CPU from the minimum CPU operating frequency to a normal CPU operating frequency, controls the power source part to supply the power to the function part and the at least one operating module, and changes the volatile memory from the self-refresh mode to a normal operation mode.

5. The image forming apparatus of claim 2, wherein, when the normal mode switch signal is input through the interface part in the first power saving mode, the control part adjusts the operating frequency of the volatile memory from the minimum memory operating frequency to a normal memory operating frequency, and adjusts the operating frequency of the CPU from the first CPU operating frequency to a normal CPU operating frequency.

6. The image forming apparatus of claim 2, wherein, when the normal mode switch signal is input through the interface part in the second power saving mode, the control part adjusts the operating frequency of the volatile memory from the minimum memory operating frequency to a normal memory operating frequency, adjusts the operating frequency of the CPU from the first CPU operating frequency to a normal CPU operating frequency, and changes the volatile memory from the self-refresh mode to a normal operation mode so that the CPU accesses the volatile memory.

7. The image forming apparatus of claim 2, wherein when the normal mode switch signal is not input during a fourth preset time in the third power saving mode, the control part converts to a fourth power saving mode and controls the power source part to shut down the power supplied to the volatile memory.

8. The image forming apparatus of claim 2, wherein, when the normal mode switch signal is not input during a fourth preset time in the third power saving mode, the control part converts to a fourth power saving mode and controls the power source part to shut down the power supplied to the volatile memory.

9. The image forming apparatus of claim 8, further comprising:
a non-volatile memory to store booting information,
wherein, when the normal mode switch signal is input through the interface part in the fourth power saving mode, the control part adjusts the operating frequency of the CPU from the minimum CPU operating frequency to a normal CPU operating frequency, controls the power source part to supply the power to the function part and the at least one operating module, and copies the booting information from the non-volatile memory to the volatile memory.

10. The image forming apparatus of claim 1, wherein the SoC part further comprises:
a phase-locked loop (PLL) part to generate different operating frequencies and to provide the generated operating frequencies to the CPU, the volatile memory, and the interface part.

* * * * *